United States Patent
Park et al.

(10) Patent No.: US 11,373,125 B2
(45) Date of Patent: Jun. 28, 2022

(54) ENERGY-SAVING DYNAMIC PRODUCTION SCHEDULING OPERATION METHOD FOR PARALLEL HEAT TREATMENT PROCESS

(71) Applicant: Korea Electronics Technology Institute, Seongnam-si (KR)

(72) Inventors: Yong Kuk Park, Seongnam-si (KR); Min Goo Lee, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 17/130,446

(22) Filed: Dec. 22, 2020

(65) Prior Publication Data

US 2021/0216933 A1 Jul. 15, 2021

(30) Foreign Application Priority Data

Jan. 10, 2020 (KR) .................. 10-2020-0003505

(51) Int. Cl.
*G06Q 10/00* (2012.01)
*G06Q 10/06* (2012.01)
(Continued)

(52) U.S. Cl.
CPC ....... *G06Q 10/06313* (2013.01); *G06N 3/126* (2013.01); *G06Q 10/06312* (2013.01);
(Continued)

(58) Field of Classification Search
CPC ...... G06Q 10/10; G06Q 10/06; G06Q 10/063; G06Q 10/0631; G06Q 10/06312;
(Continued)

(56) References Cited

U.S. PATENT DOCUMENTS

2001/0053991 A1* 12/2001 Bonabeau .............. G06Q 10/06
705/7.17
2020/0209840 A1* 7/2020 Ryu .................... G05B 13/0265

FOREIGN PATENT DOCUMENTS

JP 2011-221887 A 11/2011
KR 10-2016270 B1 8/2019

OTHER PUBLICATIONS

Wang, J., Qiao, F., Zhao, F., & Sutherland, J. W. (2016). Batch scheduling for minimal energy consumption and tardiness under uncertainties: A heat treatment application. CIRP Annals—Manufacturing Technology, 65(1), 17-20. (Year: 2016).*
(Continued)

*Primary Examiner* — William S Brockington, III
(74) *Attorney, Agent, or Firm* — Hauptman Ham, LLP (57) ABSTRACT

An energy-saving dynamic production scheduling operation method for a parallel heat treatment process which handle processes in parallel is provided. The energy-saving dynamic production scheduling operation method includes: acquiring, by a production scheduling operation system, dynamic state information of a process of each processor; scheduling, by the production scheduling operation system, the process of each processor based on the dynamic state information; and deriving, by the production scheduling operation system, an estimated cost based on a result of generating a schedule regarding the process of each processor. Accordingly, an input sequence of heat treatment target products and a combination schedule can be optimized by reflecting dynamic state information (a product inputted to a corresponding heat treatment furnace, estimated heat treatment start and end times, cooling and heating states, etc.) of a plurality of heat treatment furnace which handle processes in parallel.

9 Claims, 6 Drawing Sheets

(51) Int. Cl.
  *G06N 3/12* (2006.01)
  *G06Q 10/10* (2012.01)
  *G06Q 50/04* (2012.01)
  *G06Q 50/06* (2012.01)
  *F27D 19/00* (2006.01)

(52) U.S. Cl.
  CPC ............ *G06Q 10/10* (2013.01); *G06Q 50/04* (2013.01); *G06Q 50/06* (2013.01); *F27D 2019/0087* (2013.01)

(58) Field of Classification Search
  CPC .. G06Q 10/06313; G06Q 50/04; G06Q 50/06; G06N 3/126; F27D 2019/0087
  See application file for complete search history.

(56) References Cited

OTHER PUBLICATIONS

He, F., Wang, Z., Shen, K., & Jia, R. (2019). Research on scheduling of furnace loading quality maximization in forging heat treatment process. (Year: 2019).*

Ye Jun Oh et al., "Design of Energy Saving Dynamic Production Scheduler for Parallel Heat Treatment Process", Journal of the Institute of Electronics and Information Engineers, Oct. 2019, pp. 102-109, 56(10), The Institute of Electronics and Information Engineers, cited in NPL No. 2 with English Abstract.

Korean Office Action for corresponding Korean application No. 10-2020-0003505 dated Oct. 26, 2020, with English Translation.

* cited by examiner

|  | Job 1 | Job 2 | ••• | Job j |
|---|---|---|---|---|
| Heat Treatment Furnace 1 | $X_{1,1}$ | $X_{1,2}$ | ••• | $X_{1,j}$ |
| Heat Treatment Furnace 2 | $X_{2,1}$ | $X_{2,2}$ | ••• | $X_{2,j}$ |
| ••• | ••• | ••• | ••• | ••• |
| Heat Treatment Furnace f | $X_{f,1}$ | $X_{f,2}$ | $X_{f,3}$ | $X_{f,j}$ |

FIG. 5

Case1

Case2

ENERGY-SAVING DYNAMIC PRODUCTION SCHEDULING OPERATION METHOD FOR PARALLEL HEAT TREATMENT PROCESS

CROSS-REFERENCE TO RELATED APPLICATION(S) AND CLAIM OF PRIORITY

This application is based on and claims priority under 35 U.S.C. § 119 to Korean Patent Application No. 10-2020-0003505, filed on Jan. 10, 2020, in the Korean Intellectual Property Office, the disclosure of which is herein incorporated by reference in its entirety.

BACKGROUND

Field

The present disclosure relates generally to an energy-saving dynamic production scheduling operation method, and more particularly, to an energy-saving dynamic production scheduling operation method for a parallel heat treatment process which handles processes in parallel.

Description of Related Art

Since related-art heat treatment production processes are mainly dealt with by small and medium-sized enterprises in the root industry, many enterprises may have difficulty in applying systematized production management plans, and may mostly devise production plans based on existing workers' experiences.

Such a heat treatment process may require an operation time of several hours or one or more days at a time according to a product, and may require an energy cost since much energy is consumed when a heat treatment furnace is operated. Accordingly, enhancement of productivity and reduction in a production cost may be achieved by applying a scheduling technique, which optimizes an input sequence and a combination of target products according to a process condition (temperature, speed) and a delivery date of each heat treatment target product, based on dynamic state information of a heat treatment furnace, which changes with time.

Accordingly, in the relevant field, research on an automated dynamic production scheduler for a parallel heat treatment process, which can optimize an input sequence and a combination of heat treatment target products by reflecting a dynamic change in the state (a product inputted to a corresponding heat treatment furnace, estimated heat treatment start and end times, cooling and heating states, etc.) of a plurality of heat treatment furnaces, which handle processes in parallel at the same time, should be conducted, but the research thereon is currently unsatisfactory. Therefore, there is a demand for a method for an automated dynamic production scheduler for a parallel heat treatment process.

SUMMARY

To address the above-discussed deficiencies of the prior art, it is a primary object of the present disclosure to provide an energy-saving dynamic production scheduling operation method for a parallel heat treatment process, which can optimize an input sequence and a combination schedule of heat treatment target products by reflecting dynamic state information (a product inputted to a corresponding heat treatment furnace, estimated heat treatment start and end times, cooling and heating states, etc.) of a plurality of heat treatment furnaces, which handle processes in parallel.

According to an embodiment of the present disclosure to achieve the above-described object, an energy-saving dynamic production scheduling operation method includes: acquiring, by a production scheduling operation system, dynamic state information of a process of each processor; scheduling, by the production scheduling operation system, the process of each processor based on the dynamic state information; and deriving, by the production scheduling operation system, an estimated cost based on a result of generating a schedule regarding the process of each processor.

In addition, the dynamic state information may include at least one of information on a product inputted to the processor, information on estimated process start and end times, and information on cooling and heating states.

In addition, the scheduling may include, when a heat treatment process is ongoing in a specific heat treatment furnace, determining a working sequence with reference to an estimated end time of the ongoing process and a temperature of the current heat treatment furnace.

In addition, the scheduling may include scheduling a heat treatment process in each heat treatment furnace by reflecting energy usage information and information on a lead time according to a unit heating level of each heat treatment furnace, in order to minimize a cost and a lead time according to a change in a working temperature.

In addition, the scheduling may include scheduling a heat treatment process by applying the dynamic state information to a genetic algorithm, and the genetic algorithm may set a genomic length for each heat treatment furnace according to the dynamic state information.

The genomic length G may be calculated by using Equation 1 presented below if $N_F$ is the number of heat treatment furnaces, $N_S$ is the number of days of a schedule, $D_f$ is a scheduling delay time of the heat treatment furnace f, and $T_{f,min}$ is a minimum unit working time of an allocated lot of the heat treatment furnace f:

$$G = \sum_{f=1}^{N_F} \left( \frac{N_S - D_f}{T_{f,min}} \right). \quad \text{Equation 1}$$

In addition, the estimated cost F may be calculated by using Equation 2 presented below if $N_F$ is the number of heat treatment furnaces, $J_f$ is the number of jobs allocated to the heat treatment furnace f, $e_j$ is power consumption of a job j, $t_j$ is a lead time of the job j, $c_j$ is a TOU charge corresponding to a time of the job j, $e_{j,j+1}$ is standby power when the job j is switched to job j+1, $t_{j,j+1}$ is a waiting time when the job j is switched to the job j+1, $c_{j,j+1}$ is a TOU charge during the time when the job j is switched to the job j+1, $E_{j,j+1}$ is power consumption according to temperature change of the heat treatment furnace when the job j is switched to the job j+1, $T_{j,j+1}$ is a lead time according to temperature change of the heat treatment furnace when the job j is switched to the job j+1, $C_{j,j+1}$ is a TOU charge according to temperature change of the heat treatment furnace during the time when the job j is switched to the job j+1, and P is a penalty value:

$$F = \sum_{f=1}^{N_F} (\sum_{j=1}^{J_f} (e_j \times t_j \times c_j) + \sum_{j=1}^{J_f-1} (e_{j,j+1} \times t_{j,j+1} \times c_{j,j+1}) + \sum_{j=1}^{J_f-1} (E_{j,j+1} \times T_{j,j+1} \times C_{j,j+1})) + P \quad \text{Equation 2.}$$

In addition, the penalty value P may be calculated by using Equation 3 presented below if $P_C$ is a default penalty constant value, $P_R$ is an urgent order delivery failure penalty value, $P_T$ is a time excess penalty value, $P_L$ is an underproduction penalty value, $P_O$ is an overproduction penalty value, and $P_K$ is a contract power excess penalty value:

$$P=(P_R+P_T+P_L+P_O+P_K) \times P_C \qquad \text{Equation 3.}$$

The method may further include outputting, by the production scheduling operation system, a schedule generation result regarding prior input information in each heat treatment furnace and a heat treatment process, the schedule generation result may be a result of generating a production schedule for each facility and each lot that is expressed in the form of a graph with a time axis, and the prior input information may be information including at least one of history information regarding schedule generation and urgent order information.

According to another embodiment of the present disclosure, an energy-saving dynamic production scheduling operation system includes: a communication unit configured to acquire dynamic state information of a process of each processor; and a processor configured to schedule the process of each processor based on the dynamic state information, and to derive an estimated cost based on a result of generating a schedule regarding the process of each processor.

According to still another embodiment of the present disclosure, a computer readable recording medium having a program recorded thereon to perform an energy-saving dynamic production scheduling operation method has a computer program recorded thereon to perform the method including: acquiring, by a production scheduling operation system, dynamic state information of a process of each processor; scheduling, by the production scheduling operation system, the process of each processor based on the dynamic state information; and deriving, by the production scheduling operation system, an estimated cost based on a result of generating a schedule regarding the process of each processor.

In addition, according to yet another embodiment of the present disclosure, an energy-saving dynamic production scheduling operation method includes: acquiring, by a production scheduling operation system, dynamic state information of a process of each processor; and scheduling, by the production scheduling operation system, the process of each processor based on the dynamic state information.

According to embodiments of the present disclosure as described above, an input sequence of heat treatment target products and a combination schedule can be optimized by reflecting dynamic state information (a product inputted to a corresponding heat treatment furnace, estimated heat treatment start and end times, cooling and heating states, etc.) of a plurality of heat treatment furnace which handle processes in parallel.

In addition, according to embodiments of the present disclosure, a new schedule can be allocated immediately when a heat treatment process of each heat treatment furnace is finished regardless of whether processes of other heat treatment furnaces are finished, so that productivity and efficiency of the parallel heat treatment processes can be enhanced and an energy-saving effect can be maximized.

In addition, according to embodiments of the present disclosure, scheduling of a parallel heat treatment process can be optimized not to exceed contract power by applying the TOU tariffs, and production process scheduling can be performed not to exceed contract power even when certain contract power selectable for industrial use is applied.

In addition, according to various embodiments of the present disclosure, a maximum load avoidance scheduling function can be provided not to perform a heat treatment process at a maximum load time of the TOU tariffs by reflecting requirements of the field.

In addition, according to embodiments of the present disclosure, a production schedule of up to 7 days can be generated, and a schedule generation range can be variably changed to 1 day to 7 days according to user selection and may be provided, and a quantity of products and a delivery date of an urgent order, generated during the schedule, can be reflected to the production scheduling, so that a production quantity of each product can be satisfied within the delivery date.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the present disclosure will be described in detail with reference to the accompanying drawings.

Figure 1:
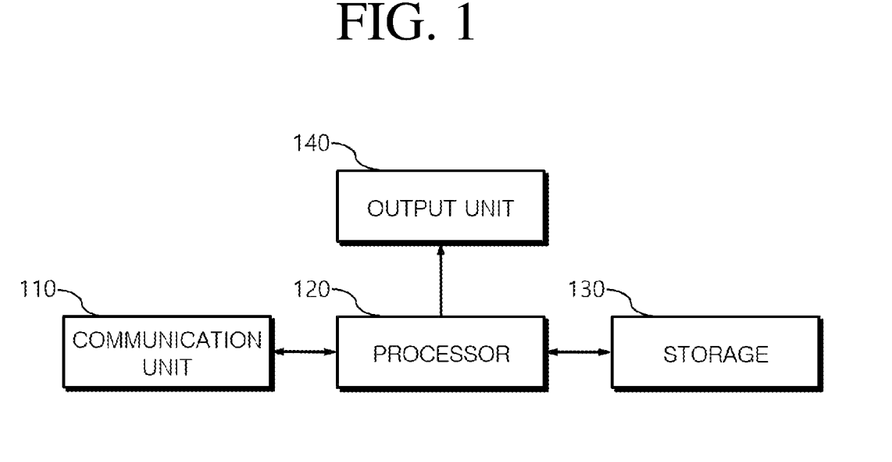
FIG. 1 is a view provided to explain an energy-saving dynamic production scheduling operation system according to an embodiment of the present disclosure.

FIG. 1 is a view provided to explain an energy-saving dynamic production scheduling operation system according to an embodiment of the present disclosure.

When a plurality of heat treatment furnaces proceed with processes in parallel, a related-art production scheduling method allocates new schedules to all of the heat treatment furnaces in a batch at a time when existing processes are all completed. That is, according to the related-art method, even when processes of some heat treatment furnaces are completed, schedules are not allocated until the process of a heat treatment furnace that has not yet been completed is completed, and accordingly, the related-art method may be referred to as a static scheduling method that is performed on the assumption that initial states of all treatment furnaces are effective states.

To overcome the limitations of such a static scheduling method, the energy-saving dynamic production scheduling operation system of the present disclosure implements a dynamic production scheduler algorithm for a parallel heat treatment process, which can respond to real-time dynamic situations such as urgent order receipt, a change in a required production quantity, by reflecting dynamic state information (a product inputted to a corresponding heat treatment furnace, estimated heat treatment start and end times, cooling and heating states, etc.) of all heat treatment furnaces which handle processes in parallel, and accordingly, can increase productivity and efficiency and can maximize an energy saving effect.

In order to perform dynamic production scheduling for a parallel heat treatment process in response to a dynamic change in situation of the field, the energy-saving dynamic production scheduling operation system of the present disclosure can change an initial state of a heat treatment furnace, and can independently set a scheduling start time for each heat treatment furnace, and can generate a schedule appropriate for a situation of the field by reflecting a contract power condition for preventing an excess of maximum demand power, and applying maximum load avoidance scheduling for stopping a process at a maximum load time.

In addition, the energy-saving dynamic production scheduling operation system of the present disclosure can generate a schedule that is more optimized for cost and time by reflecting all of energy usage information and lead time information according to a changed temperature of a furnace.

Specifically, the energy-saving dynamic production scheduling operation system of the present disclosure may apply a method of inputting a group of products for managing quality of products into a heat treatment furnace on a lot basis in the field, and may conduct a lot-based schedule design by allocating lots by product, may reflect a temperature, a processing time, and energy consumption data of a heat treatment furnace of a corresponding lot, may reflect dynamic state information (a product inputted to a corresponding heat treatment furnace, estimated heat treatment start and end times, cooling and heating states, etc.) of a plurality of heat treatment furnaces which handle processes in parallel without exceeding contract power by considering the time-of-use (TOU) tariffs of industrial power, may provide a function of avoiding a maximum load time of the TOU tariffs by reflecting a request of the field, may variably change a schedule generation range to 1 to 7 days according to user selection and may provide the schedule generation range, and may apply a dynamic situation change of a heat treatment furnace for a parallel heat treatment process which is optimized for cost and energy saving to respond to an urgent order and to satisfy a required production quantity of each product within a delivery date.

To achieve this, the energy-saving dynamic production scheduling operation system includes a communication unit 110, a processor 120, a storage 130, and an output unit 140.

The communication unit 110 is a communication means for acquiring dynamic state information of a heat treatment process of each heat treatment furnace. Specifically, the communication unit 110 may acquire information regarding an end time of a heat treatment process of each heat treatment furnace.

The processor 120 may schedule the heat treatment process in each heat treatment furnace, based on the dynamic state information, and may derive an estimated cost based on a result of generating a schedule for the heat treatment process of each heat treatment furnace.

Specifically, the processor 120 may optimize an input sequence of heat treatment target products and a combination schedule thereof by reflecting dynamic state information of the plurality of heat treatment furnaces, which handle processes in parallel.

In this case, the dynamic state information may include at least one of information on a product inputted to the heat treatment furnace, information on estimated heat treatment start and end times, information on cooling and heating states, information on contract power, information on a maximum load.

For example, when a heat treatment process is ongoing in a specific heat treatment furnace, the processor 120 may determine a working sequence with reference to an estimated end time of the ongoing process and a temperature of the current heat treatment furnace.

In addition, the processor 120 may optimize scheduling of the parallel heat treatment processes not to exceed contract power by applying the TOU tariffs.

In addition, the processor 120 can perform production process scheduling not to exceed contract power even when certain contract power which may be selected for industrial use is applied, and can provide a maximum load avoidance scheduling function not to perform a heat treatment process at a maximum load time of the TOU tariffs by reflecting requirements of the field.

In addition, the processor 120 may generate a production schedule of up to 7 days, and may variably change a schedule generation range to 1 day to 7 days according to user selection and may provide the changed schedule generation range, and may apply a quantity of products and a delivery date of an urgent order, generated during the schedule, to the production scheduling, thereby satisfying a production quantity of each product within the delivery date.

In addition, the processor 120 may schedule the heat treatment process in each heat treatment furnace by reflecting energy usage information and lead time, which change according to a unit heating level of each heat treatment furnace, in order to minimize cost and lead time according to a change in a working temperature.

In addition, the processor 120 may schedule the heat treatment process by applying the dynamic state information to a genetic algorithm, and in this case, the genetic algorithm may set a genomic length for each heat treatment furnace according to dynamic state information.

The storage 130 is a storage medium that stores a program and data necessary for operations of the processor 120.

The output unit 140 may output prior input information in each heat treatment furnace and a result of generating a schedule for the heat treatment process.

Figure 2:
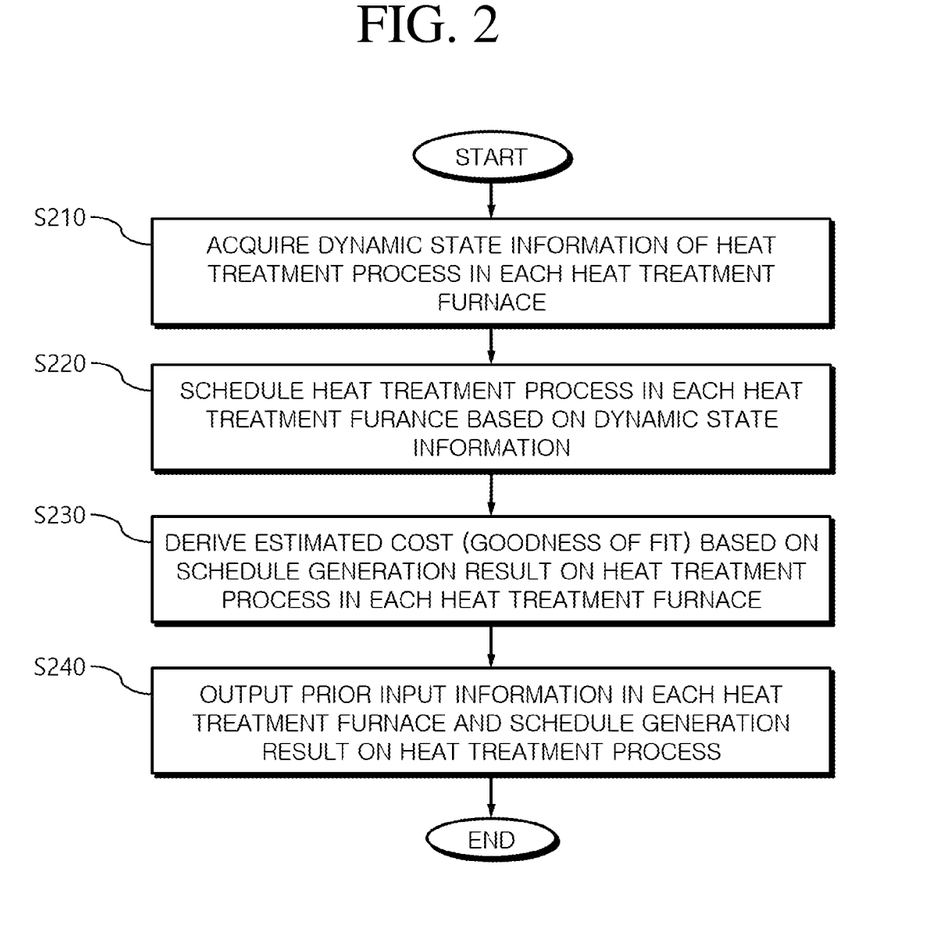
FIG. 2 is a flowchart provided to explain an energy-saving dynamic production scheduling operation method according to an embodiment of the present disclosure.

FIG. 2 is a flowchart provided to explain an energy-saving dynamic production scheduling operation method using the energy-saving dynamic production scheduling operation system according to the present embodiment.

The energy-saving dynamic production scheduling operation method according to the present embodiment may include a step of acquiring dynamic state information of a heat treatment furnace (S210), a step of scheduling the heat treatment process in each heat treatment furnace (S220), a step of deriving an estimated cost based on a result of generating a schedule (S230), and a step of outputting the result of generating the schedule (S240).

At the step of acquiring (S210), the communication unit may acquire dynamic state information of the heat treatment process in each heat treatment furnace.

At the step of scheduling (S220), the processor 120 may schedule the heat treatment process in each heat treatment furnace, based on the dynamic state information which includes information regarding a product inputted to the heat treatment furnace, estimated heat treatment start and end times, cooling and heating states, contract power, a maximum load, etc.

Specifically, at the step of scheduling (S220), when a process in a heat treatment furnace is ongoing, the processor 120 may allocate a start time of the next process in parallel with reference to an estimated end time of the current process, by reflecting a state of a facility in the field on the schedule.

In addition, at the step of scheduling (S220), the processor 120 may reflect a current temperature of a furnace on determination of a working sequence, and, when there is a heat treatment furnace that is out of order, may cross the corresponding heat treatment furnace off a scheduling list.

Figure 3:
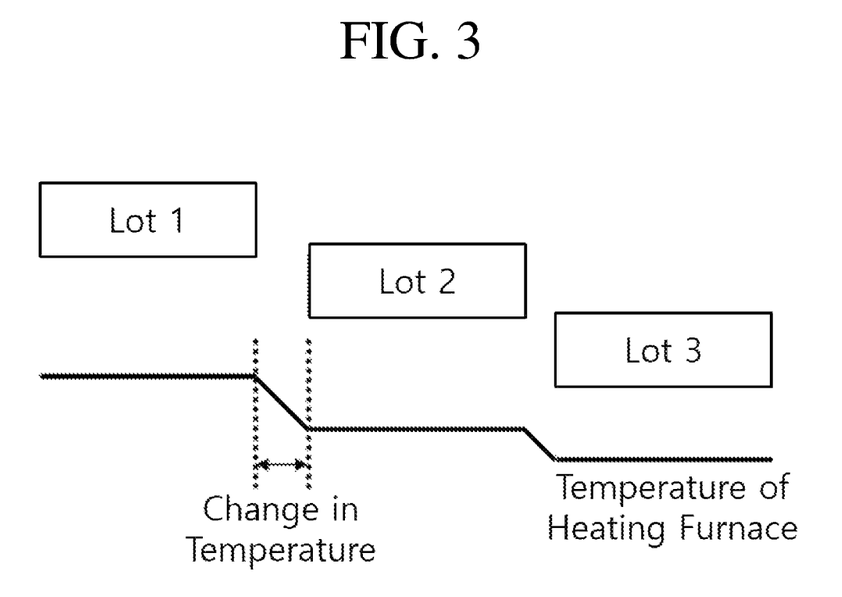
FIG. 3 is a view illustrating lots in which a working temperature is set in a descending manner.

In another example, the heat treatment process may consume much energy in a heating process of a furnace. Therefore, at the step of scheduling (S220), when working temperatures are effectively arranged in an ascending or descending manner by considering various processing temperature conditions of each lot, energy consumption in all treatment processes of the corresponding lots can be minimized. FIG. 3 is a view illustrating lots in which working temperatures are arranged in a descending manner.

To achieve this, at the step of scheduling (S220), energy usage information and information on lead time according to a unit heating level of each treatment furnace may be reflected on the schedule, and a cost and lead time according to a change in the working temperature may also be considered.

In still another example, at the step of scheduling (S220), in order to prevent an excess of maximum demand power, a contract power condition may be reflected by calculating average power on a 15-minute basis according to a demand time, based on power usage information of the generated schedule, and identifying whether contract power is exceeded, and a schedule appropriate for a situation of the field may be generated to apply maximum load avoidance scheduling for stopping a process at a maximum load time.

Herein, the contract power refers to maximum power that an electricity user requests from a supplier. When the maximum demand power exceeds the contract power, a warning regarding overuse may be notified in the first month, and a charge for overuse corresponding to 250% of basic charge may be made from the second month after overuse. Therefore, the schedule should be generated within a range not to exceed the contract power.

In yet another example, at the step of scheduling (S220), a schedule more appropriate for a situation of the field may be selected by a user by comparing a schedule applying maximum load avoidance and a normal schedule as a maximum load avoidance scheduling function.

In this case, the maximum load avoidance scheduling is a scheduling method that temporarily stops processes at a maximum load time at which the charge for power is highest in the TOU tariffs, and is increasingly used in the field.

Figure 4:
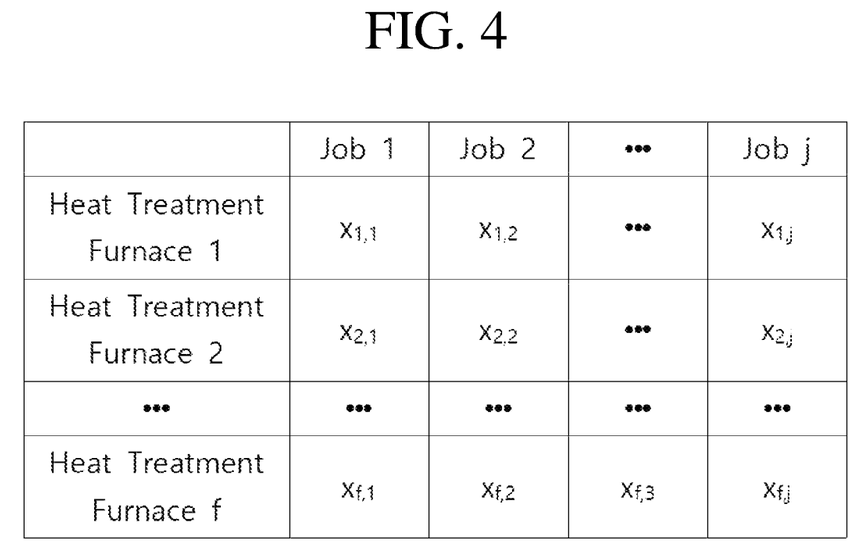
FIG. 4 is a view provided to explain a gene structure.

FIG. 4 is a view provided to explain a gene structure.

Referring to FIG. 4, at the step of scheduling (S220), the heat treatment process may be scheduled by applying the dynamic state information to a genetic algorithm.

Herein, the gene of an entity indicates a work lot sequence of each facility. If types of lots inputtable into a specific heat treatment furnace is N, each gene slot has a value ranging from 0 to N. 0 indicates that a corresponding slot is empty, and, if a value of the next gene slot is effective, the lot of the corresponding gene is inputted to work instead.

That is, a length of the gene may be determined separately according to each heat treatment furnace, and may be determined by the maximum number of lots inputtable into the corresponding heat treatment furnace during a schedule period. This equals a schedulable time divided by a minimum unit working time.

In this case, the minimum unit working time refers to a minimum time that is obtained by including not only the total working time of the lot but also an input interval when continuous input is performed.

That is, the genetic algorithm according to the present embodiment may set a genomic length for each heat treatment furnace according to the dynamic state information, and the genomic length G may be calculated by using Equation 1 presented below if $N_F$ is the number of heat treatment furnaces, $N_S$ is the number of days of a schedule, $D_f$ is a scheduling delay time of the heat treatment furnace f, and $T_{f,min}$ is a minimum unit working time of an allocated lot of the heat treatment furnace f:

$$G = \sum_{f=1}^{N_F} \left( \frac{N_S - D_f}{T_{f,min}} \right) \quad \text{Equation 1}$$

At the step of deriving (S230), the processor 120 may derive an estimated cost based on the result of generating the schedule regarding the heat treatment process in each heat treatment furnace.

Specifically, at the step of deriving (S230), the schedule may be generated to calculate a cost, and then, an estimated cost may be derived by applying the TOU tariffs to estimated energy usage information, and may be used as goodness of fit.

The estimated cost F which is used as a function of goodness of fit for collecting final results of the production scheduler may be calculated by using Equation 2 presented below if $N_F$ is the number of heat treatment furnaces, $J_f$ is the number of jobs allocated to the heat treatment furnace f, $e_j$ is power consumption of a job j, $t_j$ is a lead time of the job j, $c_j$ is a TOU charge corresponding to a time of the job j, $e_{j,j+1}$ is standby power when the job j is switched to job j+1, $t_{j,j+1}$ is a waiting time when the job j is switched to the job j+1, $c_{j,j+1}$ is a TOU charge during the time when the job j is switched to the job j+1, $E_{j,j+1}$ is power consumption according to temperature change of the heat treatment furnace when the job j is switched to the job j+1, $T_{j,j+1}$ is a lead time according to temperature change of the heat treatment furnace when the job j is switched to the job j+1, $C_{j,j+1}$ is a TOU charge according to temperature change of the heat treatment furnace during the time when the job j is switched to the job j+1, and P is a penalty value:

$$F = \sum_{f=1}^{N_F}(\sum_{j=1}^{J_f}(e_j \times t_j \times c_j)) + \sum_{j=1}^{J_f-1}(e_{j,j+1} \times t_{j,j+1} \times c_{j,j+1}) + \sum_{j=1}^{J_f-1}(E_{j,j+1} \times T_{j,j+1} \times C_{j,j+1}) + P \quad \text{Equation 2.}$$

In addition, the penalty value P may be calculated by using Equation 3 presented below if $P_C$ is a default penalty constant value, $P_R$ is an urgent order delivery failure penalty value, $P_T$ is a time excess penalty value, $P_L$ is an underproduction penalty value, $P_O$ is an overproduction penalty value, and $P_K$ is a contract power excess penalty value:

$$P = (P_R + P_T + P_L + P_O + P_K) \times P_C \quad \text{Equation 3}$$

The default penalty constant value $P_C$ may be defined by a cost incurred on the assumption that a lot consuming the highest energy from among lots allocated to each heat treatment furnace is operated during a schedule period, by applying the highest charge of the TOU tariffs, to impose a quantitative penalty in proportion to an energy cost.

That is, the penalty constant value $P_C$ may be calculated by using Equation 4 presented below if $M_f$ is maximum power consumption of the allocated lot of the heat treatment furnace f, $N_S$ is the number of days of a schedule, and C is a maximum charge of the TOU tariffs:

$$P_C = M_f \times N_S \times 24 \times C \quad \text{Equation 4}$$

A period of the generated schedule may be determined according to a schedule period inputted by a user. If a job schedule of a specific heat treatment furnace exceeds the number of days of the determined schedule, a minimum unit working time of the corresponding heat treatment furnace may be obtained and then an excess time ratio regarding this may be calculated, and a solution for finishing a job within the determined job schedule may be obtained by reflecting the excess time ratio on the penalty $P_T$.

In this case, the time excess penalty value $P_T$ may be calculated by using Equation 5 presented below if $N_F$ is the number of heat treatment furnaces, $E_f$ is power consumption of the heat treatment furnace f, and $T_{f,min}$ is a minimum unit working time of an allocated lot of the heat treatment furnace f:

$$P_T = \sum_{f=1}^{N_F}(E_f/T_{f,min}) + 1 \quad \text{Equation 5}$$

The urgent order refers to an order requesting that production should be completed within a predetermined time within the schedule period. Accordingly, if the delivery of the urgent order is not completed within a time limit, a value that is obtained by multiplying the number of orders failing to deliver by the default penalty constant value $P_C$ may be applied as the penalty $P_R$.

The energy-saving dynamic production scheduling operation method may calculate a required production quantity of each product from received order information, and, if the generated schedule does not satisfy the required production quantity, the penalty $P_L$ may be imposed as much as an underproduction ratio of each product.

In this case, the underproduction penalty value $P_L$ may be calculated by using Equation 6 presented below if $N_P$ is a type of a produced product, $R_p$ is a required production quantity of the product p, and $O_p$ is a production quantity of the product p:

$$P_L = \sum_{p=1}^{N_P}\left(\frac{R_p - O_p}{R_p}\right) + 1 \quad \text{Equation 6}$$

In addition, if an excessive production quantity exceeds a maximum production unit of a corresponding product, the energy-saving dynamic production scheduling operation method imposes the penalty $P_O$ as much as a overproduction ratio. In this case, the maximum production unit corresponds to the largest quantity of lots to which the corresponding product is inputted.

Specifically, the overproduction penalty value $P_O$ may be calculated by using Equation 7 presented below if $N_P$ is a type of a produced product, $R_p$ is a required production quantity of the product p, $O_p$ is a production quantity of the product p, $V_{p,max}$ is a maximum production unit of the product p:

$$P_O = \sum_{p=1}^{N_P}\left(\frac{O_p - R_p}{V_{p,max}}\right) \quad \text{Equation 7}$$

The energy-saving dynamic production scheduling operation method may divide the generated schedule by a 15-minute unit section which is a demand time and then may calculate average power of each section. In this case, if there exists a section exceeding contract power, the default penalty constant value $P_C$ may be applied as the penalty $P_K$.

Figure 5:
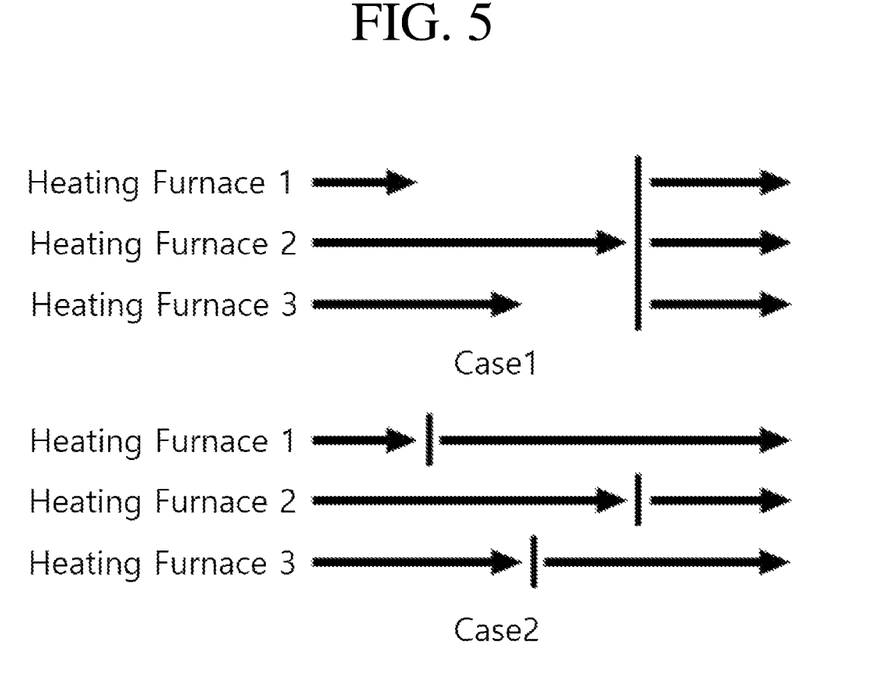
FIG. 5 is a view illustrating schedule start points of time of case 1 where related-art static scheduling is applied, and case 2 where dynamic scheduling according to an embodiment of the present disclosure is applied.
Figure 6:
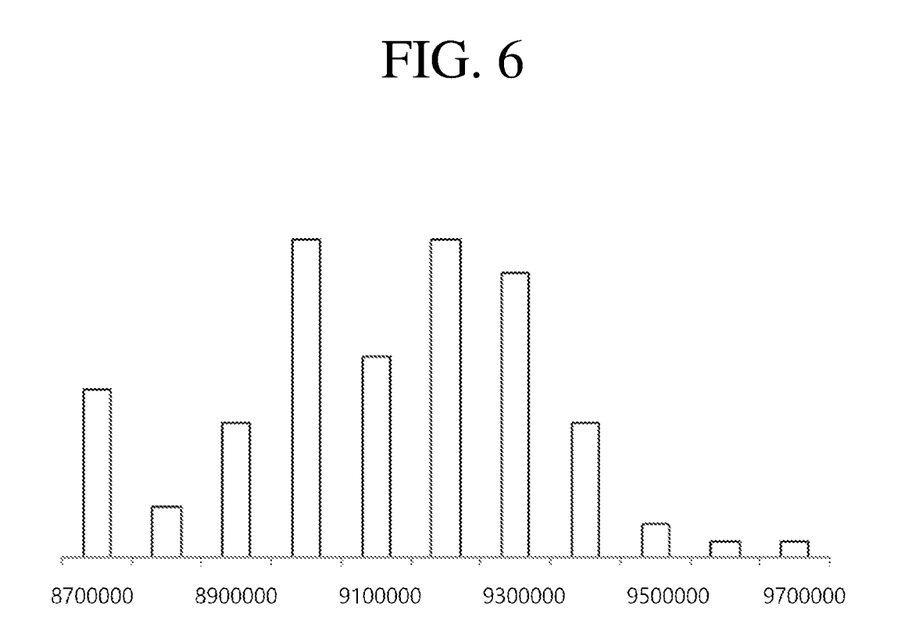
FIG. 6 is a view illustrating a result of a simulation regarding a cost distribution of case 1 where related-art scheduling is applied.
Figure 7:
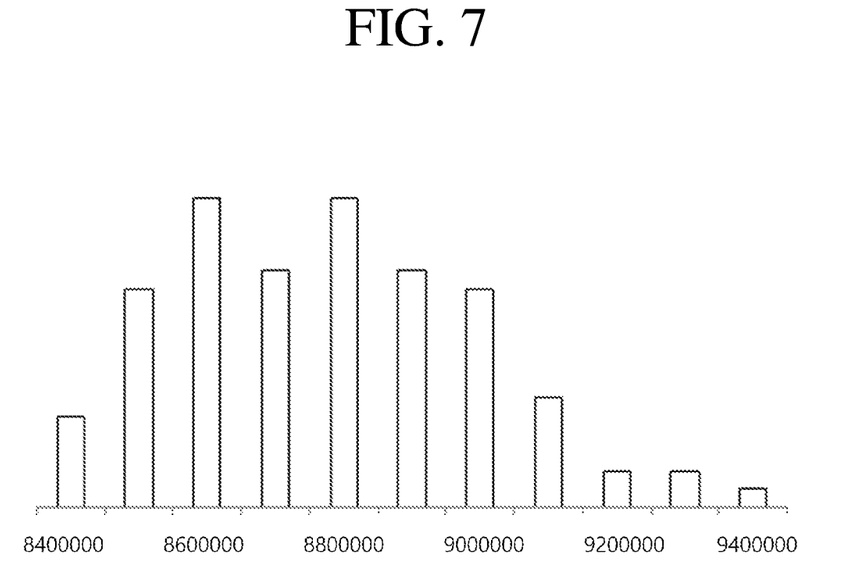
FIG. 7 is a view illustrating a result of a simulation regarding a cost distribution of case 2 where dynamic scheduling according to an embodiment is applied.

FIG. 5 is a view illustrating schedule start points of time of case 1 where related-art static scheduling is applied, and case 2 where dynamic scheduling according to an embodiment of the disclosure is applied, FIG. 6 is a view illustrating a result of a simulation regarding a cost distribution of case 1 where related-art static scheduling is applied, and FIG. 7 is a view illustrating a result of a simulation regarding a cost distribution of case 2 where dynamic scheduling according to an embodiment of the disclosure is applied.

Results of proceeding with a simulation in the same environment as the related-art static scheduling method (Case 1) to evaluate effectiveness and performance of the energy-saving dynamic production scheduling operation method according to the present embodiment are illustrated in FIGS. 6 and 7.

Specifically, a simulation for an order quantity was performed to evaluate performance of a scheduler. A schedule start time was set to 05 o'clock and a period was set to 3 days, and it was assumed that processes in all treatment furnaces was ongoing. Industrial service (B)-High Voltage A-Option III in the electric rates table was applied.

Referring to FIG. 5, in the case 1, new schedules are allocated to all heat treatment furnaces in a batch when existing processes are all completed, but in the case 2, a new schedule is allocated immediately when an existing process of each heat treatment furnace is finished.

According to the result of the simulation, average use of electricity and cost in the schedules of case 2 were reduced in comparison to those in case 1, and the total working time was reduced, and accordingly, it can be seen that the dynamic scheduler applying the energy-saving dynamic production scheduling operation method of the present disclosure generates a schedule showing excellent performance in view of cost and time, compared to the existing scheduler.

Referring to FIGS. 6 and 7, it can be seen that the two cases showed that the cost distribution is close to a normal distribution, and had a low standard deviation of 3% or less compared to average, and showed good results in convergence and uniformity of a solution. Accordingly, the present scheduler can be expected to generate a stable and optimum schedule in the field.

At the step of outputting (S240) according to an embodiment of the present disclosure, the output unit 140 may output the schedule generation result regarding the heat treatment process in each heat treatment furnace.

For example, the output unit 140 may provide the UI for performing the operation setting function of the user, and an amount of used energy can be identified on a lower end and schedule information such as cost and used power may be displayed on the left.

In addition, the output unit 140 may identify input of prior information such as history information regarding generation of a schedule, urgent order information, etc. in order to effectively provide an output result of the production scheduler, and may provide the production scheduling output result for each facility and each lot in the form of a graph with a time axis.

Through this, an input sequence of heat treatment target products and a combination schedule can be optimized by reflecting dynamic state information of the plurality of heat treatment furnaces which handle processes in parallel.

In addition, a new schedule can be allocated immediately when a heat treatment process of each heat treatment furnace is finished regardless of whether processes of other heat treatment furnaces are finished, so that productivity and efficiency of the parallel heat treatment processes can be enhanced and an energy-saving effect can be maximized.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. An energy-saving dynamic production scheduling operation method, the method performed by a production scheduling operation system having a processor and a plurality of heat treatment furnaces, the method comprising:

acquiring, by the processor, dynamic state information of a heat treatment process of each furnace of the plurality of heat treatment furnaces;

generating, by the processor, a schedule regarding the heat treatment process of each furnace by applying the dynamic state information to a genetic algorithm, wherein the genetic algorithm is configured to set a genomic length G for each furnace according to the dynamic state information; and controlling each furnace to operate a work lot sequence based on the schedule regarding the heat treatment process of each furnace, wherein the genomic length G is calculated by using Equation 1 below, $$G = \sum_{f=1}^{N_F} \left( \frac{N_S - D_f}{T_{f,min}} \right), \quad \text{Equation 1}$$

where $N_F$ is a number of heat treatment furnaces, $N_S$ is a number of days of the schedule, $D_f$ is a scheduling delay time of a heat treatment furnace f, and $T_{f,min}$ is a minimum unit working time of an allocated lot of the heat treatment furnace f.

2. The method of claim 1, wherein the dynamic state information comprises at least one of information on a product inputted to a furnace of the plurality of heat treatment furnaces, information on estimated process start and end times of the furnace, and information on cooling and heating states of the furnace.

3. The method of claim 1, wherein generating the schedule regarding the heat treatment process comprises, when the heat treatment process is ongoing in a specific heat treatment furnace, determining a working sequence with reference to an estimated end time of the ongoing heat treatment process and a temperature of the specific heat treatment furnace.

4. The method of claim 1, wherein generating the schedule regarding the heat treatment process comprises setting the heat treatment process in each furnace by reflecting energy usage information and information on a lead time according to a unit heating level of each furnace.

5. The method of claim 1, further comprising calculating, by the processor, an estimated cost based on the generated schedule regarding the heat treatment process of each furnace, wherein the estimated cost F is calculated by using Equation 2 below, where $J_f$ is a number of jobs allocated to the heat treatment furnace f, $e_j$ is power consumption of a job j, $t_j$ is a lead time of the job j, $c_j$ is a Time of Use (TOU) charge corresponding to a time of the job j, $e_{j,j+1}$ is standby power when the job j is switched to job j+1, $t_{j,j+1}$ is a waiting time when the job j is switched to the job j+1, $c_{j,j+1}$ is a TOU charge during the time when the job j is switched to the job j+1, $E_{j,j+1}$ is power consumption according to temperature change of the heat treatment furnace when the job j is switched to the job j+1, $T_{j,j+1}$ is a lead time according to temperature change of the heat treatment furnace when the job j is switched to the job j+1, $c_{j,j+1}$ is a TOU charge according to temperature change of the heat treatment furnace during a time when the job j is switched to the job j+1, and P is a penalty value:

$$F = \Sigma_{f=1}^{N_F}(\Sigma_{j=1}^{J_f}(e_j \times t_j \times c_j) + \Sigma_{j=1}^{J_f-1}(e_{j,j+1} \times t_{j,j+1} \times c_{j,j+1}) + \Sigma_{j=1}^{J_f-1}(E_{j,j+1} \times T_{j,j+1} \times C_{j,j+1})) + P \quad \text{Equation 2.}$$

6. The method of claim 5, wherein the penalty value P is calculated by using Equation 3 below, where $P_C$ is a default penalty constant value, $P_R$ is an urgent order delivery failure penalty value, $P_T$ is a time excess penalty value, $P_L$ is an underproduction penalty value, $P_O$ is an overproduction penalty value, and $P_K$ is a contract power excess penalty value:

$$P = (P_R + P_T + P_L + P_O + P_K) \times P_C \quad \text{Equation 3.}$$

7. The method of claim 1, further comprising:

outputting, by the processor, a schedule generation result regarding prior input information in each furnace and the heat treatment process of each furnace, wherein the schedule generation result is a result of generating a production schedule for each facility and each lot that is expressed as a graph with a time axis, and wherein the prior input information is information comprising at least one of history information regarding schedule generation and urgent order information on each furnace.

8. An energy-saving dynamic production scheduling operation system comprising:

a plurality of heat treatment furnaces; and a processor configured to generate a schedule regarding a heat treatment process of each furnace based on dynamic state information, and to control each furnace to operate a work lot sequence based on the schedule regarding the heat treatment process of each furnace, wherein the processor is configured to:

acquire the dynamic state information of a process of each furnace of the plurality of heat treatment furnaces;

generate the schedule regarding the heat treatment process of each furnace by applying the dynamic state information to a genetic algorithm, wherein the genetic algorithm is configured to set a genomic length G for each furnace according to the dynamic state information; and control each furnace to operate the work lot sequence based on the schedule regarding the heat treatment process of each furnace, and wherein the genomic length G is calculated by using Equation 1 below, $$G = \sum_{f=1}^{N_F} \left( \frac{N_S - D_f}{T_{f,min}} \right),  \quad \text{Equation 1}$$

where $N_F$ is a number of heat treatment furnaces, $N_S$ is a number of days of the schedule, $D_f$ is a scheduling delay time of a heat treatment furnace f, and $T_{f,min}$ is a minimum unit working time of an allocated lot of the heat treatment furnace f.

9. A non-transitory computer readable recording medium having a program recorded thereon to perform an energy-saving dynamic production scheduling operation method, the method performed by a production scheduling operation system having a processor and a plurality of heat treatment furnaces, the method comprising:

acquiring, by the processor, dynamic state information of a heat treatment process of each furnace of the plurality of heat treatment furnaces;

generating, by the processor, a schedule regarding the heat treatment process of each furnace by applying the dynamic state information to a genetic algorithm, wherein the genetic algorithm is configured to set a genomic length G for each furnace according to the dynamic state information; and controlling each furnace to operate a work lot sequence based on the schedule regarding the heat treatment process of each furnace, wherein the genomic length G is calculated by using Equation 1 below, $$G = \sum_{f=1}^{N_F} \left( \frac{N_S - D_f}{T_{f,min}} \right),  \quad \text{Equation 1}$$

where $N_F$ is a number of heat treatment furnaces, $N_S$ is a number of days of the schedule, $D_f$ is a scheduling delay time of a heat treatment furnace f, and $T_{f,min}$ is a minimum unit working time of an allocated lot of the heat treatment furnace f.

* * * * *